Patented Jan. 2, 1923.

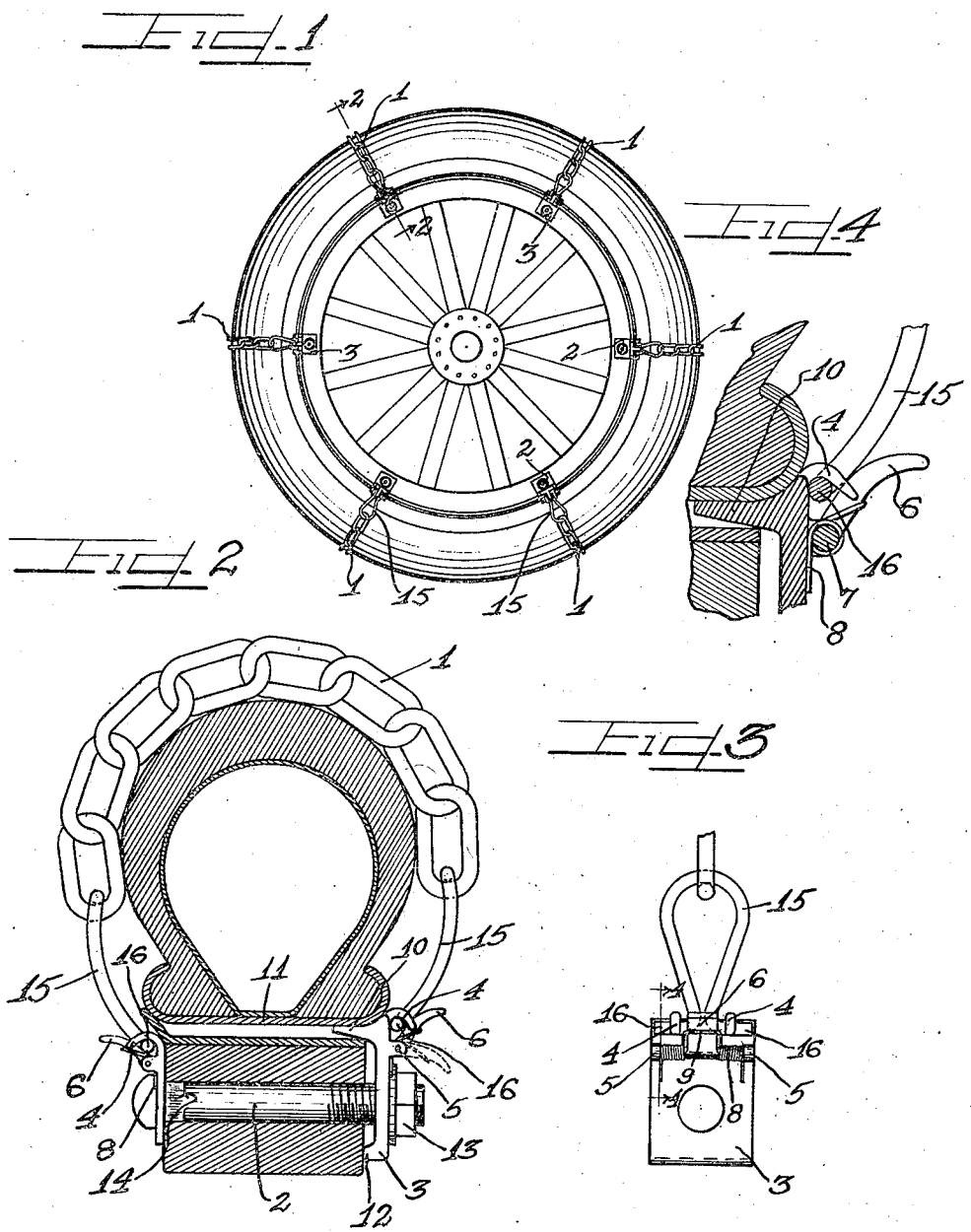

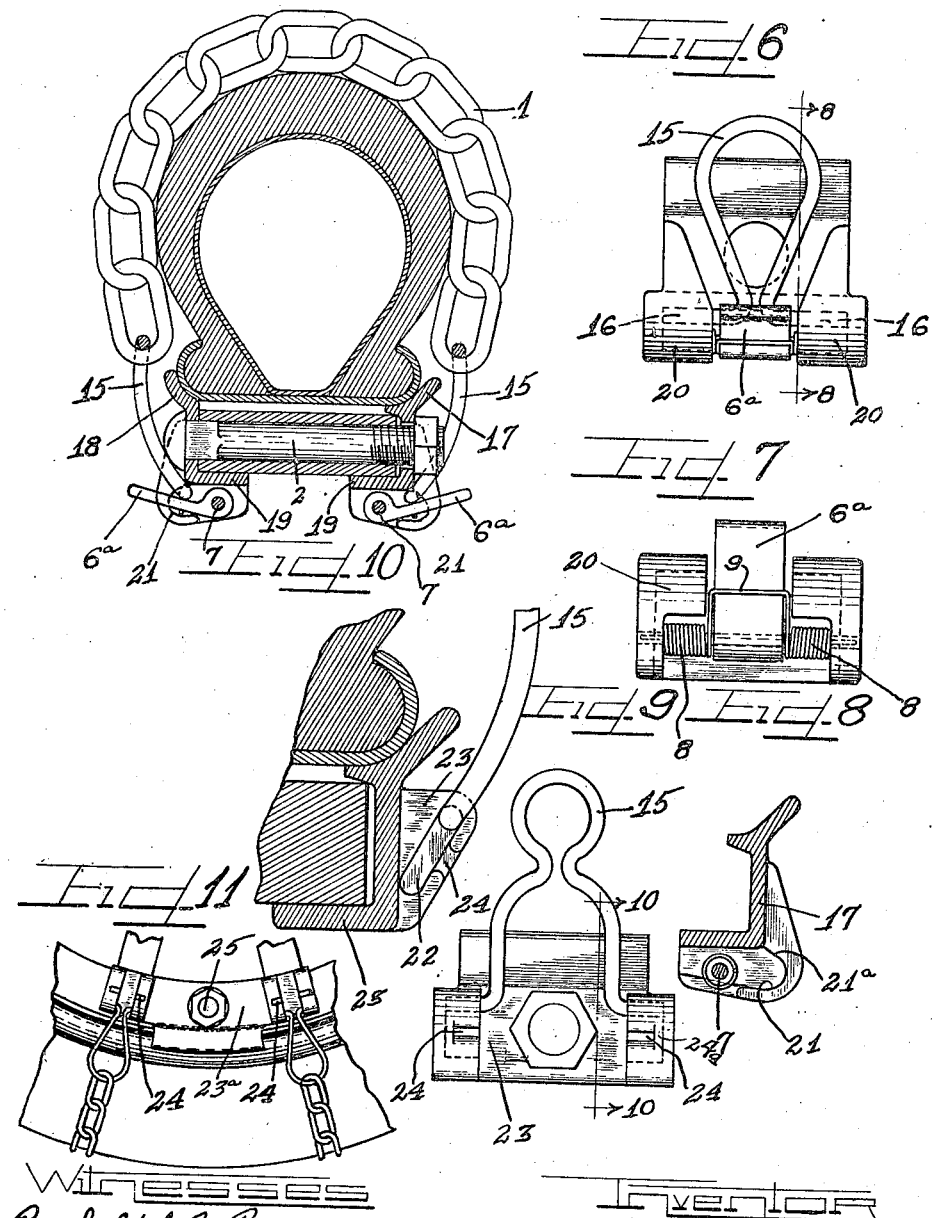

1,440,630

UNITED STATES PATENT OFFICE.

AUGUST P. SCHEIN, OF CHICAGO, ILLINOIS.

ANTISKID CHAIN AND ATTACHING MEANS THEREFOR.

Application filed March 11, 1922. Serial No. 542,899.

*To all whom it may concern:*

Be it known that I, AUGUST P. SCHEIN, a citizen of the United States, and a resident of the city of Chicago, in the county of Cook and State of Illinois, have invented certain new and useful Improvements in Antiskid Chains and Attaching Means Therefor; and I do hereby declare that the following is a full, clear, and exact description of the same, reference being had to the accompanying drawings, and to the numerals of reference marked thereon, which form a part of this specification.

This invention relates to anti-skid chains and attaching means therefor, and it is an object of this invention to avoid a series of connected chains as now commonly used and apply a plurality of separate chains transversely of the tire and secure the same by novel anchoring or securing means that can be readily and quickly operated.

It is also an object of this invention to provide anchoring lugs that take up the slack of the chains.

With these and other objects in view which will become more apparent in the following description and disclosures in the drawing, this invention comprises the novel mechanism and combinations hereinafter described and more particularly pointed out and defined in the appended claims.

In the accompanying drawings which illustrate a preferred embodiment of this invention and in which similar reference numerals refer to similar features in the different views, Figure 1 is a side elevation of an automobile wheel with my anti-skid chains attached.

Figure 2 is a section on the line 2—2 of Figure 1, upon an enlarged scale.

Figure 3 is an elevation of the clamp used to attach the chains, and a portion of the chain attached thereto.

Figure 4 is a section on the line 4—4 of Figure 3, showing parts of the wheel structure in section, upon an enlarged scale.

Figure 5 is a cross section through a wheel illustrating a modified form of my invention.

Figure 6 is an elevational view of the modified form of attaching means upon an enlarged scale.

Figure 7 is a bottom plan view of the attaching means.

Figure 8 is a section upon substantially the line 8—8 of Figure 6.

Figure 9 is an elevational view of a further modified form of attaching means.

Figure 10 is a section on the line 10—10 of Figure 9.

Figure 11 is an enlarged fragmentary view of another modified form of this invention.

As shown on the drawings:

In referring to the drawings, especially to Figures 1 to 4, it will be observed that a plurality of independent anti-skid chains 1 have been illustrated, and that these chains extend transversely of the wheel and are secured at their ends to means attached on opposite sides of the bolts 2 of the wheel which usually sustain the demountable rim lugs.

The anchoring means for each chain on one side of the wheel comprises a specially constructed demountable rim anchor plate or lug 3 which has a pair of spaced hooks or prongs 4 at its upper end and a pair of ears 5 just below the hooks for supporting a latch 6 which has laterally projecting pintles 7 journalled in bearing apertures in said ears 5, said latch being designed to fit between the hooks 4 and cooperate therewith for securely latching said chain on the wheel. The latch 6 is impelled upwardly by a spring 8 provided with a pair of spaced coils surrounding the pintles of the latch adjacent the ears 5, the ends of said spring bearing against the anchor lug 3 and the bridging portion 9 between the coils bearing against the latch 6. The anchoring lug 3 is provided with the usual wedging lug 10 for retaining the clincher rim 11 in position and the fulcrum lug 12 at the lower end thereof. The clips 3 are provided with apertures to receive the bolts 2 and are clamped against the wheel by the nuts 13.

The anchoring means 14 on the opposite side of the wheel are similar to the anchor lugs 3 with the exception that they do not have the wedging lugs 10 for retaining the tire, nor the fulcrum lugs 12, for reasons which appear obvious.

The ends of each of the chains 1 are connected to links or bails 15 which are in the form of loops converging from their upper ends to substantially a closed point, the lower ends being bent outwardly at substantially right angles to a central longitudinal axis of the links to provide trunnion members 16 adapted to fit under the hook members 4 for firmly securing the chains to the wheel.

It is evident that with the anchoring means 3 and 14 attached to the wheel, the separate chains may be successively anchored to the wheel in a very few moments. To anchor a chain to the wheel at any predetermined point, it is only necessary to move the latch 6 on one side of the wheel downwardly at that point, position the trunnions 16 under the hooks 4, then allowing the latch 6 to spring upwardly against the bail 15 for securely interlocking the same, then bringing the other end of the chain to the opposite side of the wheel, and anchoring the trunnion 16 under the hooks 4, as already explained.

In the modified form of this invention, as disclosed in Figures 5 to 8, the anchoring means for the chains consists of opposite lugs 17 and 18 secured in position on the sides of the rim by means of the bolt 2. These lugs are provided with lower flanges 19 which embrace the felloe of the wheel. The lugs 17 and 18 have laterally projecting spaced ears 20 in which U-shaped or arcuate grooves 21 open at their inner ends to provide entrance slots are formed for receiving the trunnions 16 on the bail members 15 to which the chains 1 are attached. Latch members 6ª are yieldingly supported on small rod shafts 7 similar to the way in which the latch members 6 are supported, and are spring-pressed against the bails 15 to hold the same effectively in the grooves 21.

In using these modified forms of anchoring lugs 17 and 18, the trunnions 16 are adapted to normally engage the upper walls 21ª of the grooves 20. However when the load of the vehicle passes over or rests upon a chain 1 and compresses the tire at that point, a slack will be produced, in the chain, and this slack will be taken up by a movement of the trunnions 16 around the curved grooves 21.

Instead of making the grooves 21 of curved formation for the purpose of taking up the aforementioned slack, the grooves might be made straight and suitably inclined as is illustrated by the grooves 22 in the anchoring lug 23 shown in Figures 9 and 10, whereby the slack of the chains will be more quickly taken up, and entrance slots 24 may be formed in the walls of these straight inclined grooves for admitting the trunnions 16 of the bails 15, as is obvious. The entrance slots 24 are not coextensive with the horizontal width of the grooves whereby shrouds 24ª (Fig. 9) are formed which prevent the trunnions on the bail member 15 from being withdrawn without pressing the same together. If desirable, spring latches such as illustrated may be used to close the notches 24.

The manner of attaching the chains to these modified forms of lugs is fairly obvious; a bail member 15 of a chain being first anchored upon one side of the wheel, and the chain passed over the tire and the other bail member secured to the opposite lug.

The anchoring lug 23 may be made with a plurality of spaced sets of grooves for anchoring a plurality of chains, as shown in Figure 11, in which the modified form of anchoring lug 23ª extends between two spokes, being secured to the felloe of the wheel by a bolt 25 intermediate the spokes. In the present instance, the anchoring lug 23ª is provided with two sets of grooves 22 and two entrance slots 24, whereby two chains may be anchored to the anchoring lug 23ª.

It is characteristic of this invention that a plurality of independent chains are used and that each is separately anchored to the wheel by novel forms of lugs that allow rapid assembling, and that the chains are removably latched to the lugs. It is further characteristic of this invention that the lugs may be constructed to take up the slack in the chains.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. An anchoring device for an anti-skid chain comprising a bail member having a pair of trunnions, and a lug having a pair of spaced grooves for receiving said trunnions, and a spring-impelled latch member having means for pivoting the same to said lug for retaining said trunnions in said grooves.

2. An anchoring device for an anti-skid chain comprising a bail member having a pair of trunnions, and a lug having spaced grooves with an entrance slot leading to said grooves for receiving the trunnions of said bail member, and means for normally retaining the trunnions in said grooves.

3. An anchoring device for an anti-skid chain comprising a bail member having a pair of trunnions, and a lug having grooves with entrance slots for receiving said trunnions, said grooves being of such an extent as to take up the slack of said anti-skid chain, and means for preventing said trunnions from emerging through said entrance slots.

4. An anchoring device for anti-skid chains comprising a lug having spaced grooves in one lateral face thereof with an entrance passage leading to said grooves, in combination with a bail member having trunnions slidably mounted in said grooves, and means for normally retaining said trunnions in said grooves.

In testimony whereof I have hereunto subscribed my name in the presence of two subscribing witnesses.

AUGUST P. SCHEIN.

Witnesses:
CARLTON HILL,
JAMES M. O'BRIEN.